(12) United States Patent
Ogawara (10) Patent No.: US 9,661,677 B2
(45) Date of Patent: May 23, 2017

(54) WIRELESS COMMUNICATION APPARATUS, WIRELESS COMMUNICATION METHOD, AND COMPUTER-READABLE STORAGE MEDIUM

(71) Applicant: Osamu Ogawara, Kanagawa (JP)

(72) Inventor: Osamu Ogawara, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 468 days.

(21) Appl. No.: 14/151,003

(22) Filed: Jan. 9, 2014

(65) Prior Publication Data

US 2014/0198727 A1 Jul. 17, 2014

(30) Foreign Application Priority Data

Jan. 16, 2013 (JP) .................. 2013-005600
Nov. 21, 2013 (JP) .................. 2013-240954

(51) Int. Cl.
*H04W 76/02* (2009.01)
*H04W 36/08* (2009.01)

(52) U.S. Cl.
CPC ......... *H04W 76/028* (2013.01); *H04W 36/08* (2013.01)

(58) Field of Classification Search
None
See application file for complete search history.

(56) References Cited

U.S. PATENT DOCUMENTS

| | | | |
|---|---|---|---|
| 2003/0097473 A1* | 5/2003 | Saitoh | H04L 29/12009 709/245 |
| 2011/0158208 A1* | 6/2011 | Solanki | H04L 12/185 370/338 |
| 2011/0237254 A1* | 9/2011 | Lee | H04N 21/234 455/435.2 |
| 2013/0272224 A1 | 10/2013 | Ogawara | |
| 2014/0243003 A1* | 8/2014 | Somasundaram | H04W 24/10 455/450 |

FOREIGN PATENT DOCUMENTS

JP 2012-065208 3/2012

* cited by examiner

*Primary Examiner* — Srinivasa Reddivalam
(74) *Attorney, Agent, or Firm* — Oblon, McClelland, Maier & Neustadt, L.L.P.

(57) ABSTRACT

A wireless communication apparatus is for communicating with an access point through a first communication and communicating with another communication apparatus through a second communication via a network including an access point. The wireless communication apparatus includes a detection unit configured to detect a status of the first communication; and a reconnection unit configured to reconnect the first communication and then reconnect the second communication by using connection information of a corresponding network layer of the wireless communication apparatus acquired through the first communication when disconnection of the first communication is detected by the detection unit.

9 Claims, 7 Drawing Sheets

WIRELESS COMMUNICATION APPARATUS, WIRELESS COMMUNICATION METHOD, AND COMPUTER-READABLE STORAGE MEDIUM

CROSS-REFERENCE TO RELATED APPLICATIONS

The present application claims priority to and incorporates by reference the entire contents of Japanese Patent Application No. 2013-005600 filed in Japan on Jan. 16, 2013 and Japanese Patent Application No. 2013-240954 filed in Japan on Nov. 21, 2013.

BACKGROUND OF THE INVENTION

1. Field of the Invention

The present invention relates to a wireless communication apparatus, a wireless communication method, and a computer-readable storage medium.

2. Description of the Related Art

Conventionally, there is known a technique of automatically reconnecting a wireless network when connection of the wireless network is broken. For example, Japanese Laid-open Patent Publication No. 2012-065208 discloses an apparatus that reconnects a wireless network when its connection is broken.

However, in a wireless communication apparatus disclosed in Japanese Laid-open Patent Publication No. 2012-065208, after disconnection of wireless communication performed between the wireless communication apparatus and an access point (first communication), if address information such as an IP address, a subnet mask address, or a default gateway address of the wireless communication apparatus provided by the access point is changed, communication between the wireless communication apparatus and another communication apparatus via a network (second communication) becomes unable to resume. To explain this more specifically, the access point continues to transmit a wireless signal referred to as "beacon" with a constant interval so as to inform the presence of the access point itself to the wireless communication apparatus. The beacon includes a 32-byte SSID (Service Set Identifier) for indentifying a wireless network. Conventionally, connection is made with an SSID and an identification/encryption method which are the same as those before the disconnection. Although no problem occurs as far as the address information provided by the access point is not changed, for example, when the access point changes the IP address allocated to the wireless communication apparatus, the second communication cannot be performed unless the IP address of the wireless communication apparatus to be reconnected is also changed.

As for the OSI (Open Systems Interconnection) reference model, although reconnection is established on the layer 2 level, which is from a physical layer to a data link layer, reconnection is not established on the layer 3 level or higher, which is a network layer or higher. Therefore, a process during communication cannot be performed. To avoid this problem, a user needs to change and initialize the setting of the wireless communication apparatus and to change and initialize the setting of layers at the layer 3 level or higher; however, this processing is difficult for users who do not have any expertise in this technique.

Therefore, there is a need to provide a wireless communication apparatus, a wireless communication method, and a program in which, even if connection information of a network layer is changed after reconnection of communication between an access point to the wireless communication apparatus via wireless communication, the connection information of the network layer is automatically acquired, and thus communication to a communication counterpart can be made.

SUMMARY OF THE INVENTION

It is an object of the present invention to at least partially solve the problems in the conventional technology.

According to an embodiment, there is provided a wireless communication apparatus for communicating with an access point through a first communication and communicating with another communication apparatus through a second communication via a network including an access point. The wireless communication apparatus includes a detection unit configured to detect a status of the first communication; and a reconnection unit configured to reconnect the first communication and then reconnect the second communication by using connection information of a corresponding network layer of the wireless communication apparatus acquired through the first communication when disconnection of the first communication is detected by the detection unit.

According to another embodiment, there is provided A wireless communication method performed by using a wireless communication apparatus for communicating with an access point through a first communication and communicating with another communication apparatus through a second communication via a network including an access point. The wireless communication method includes detecting a status of the first communication; and reconnecting the first communication and then reconnecting the second communication by using connection information of a corresponding network layer of the wireless communication apparatus acquired through the first communication when disconnection of the first communication is detected at the detecting.

According to still another embodiment, there is provided a non-transitory computer-readable storage medium with an executable program stored thereon and executed by a computer of a wireless communication apparatus for communicating with an access point through a first communication and communicating with another communication apparatus through a second communication via a network including an access point. The program instructs the computer to perform detecting a status of the first communication; and reconnecting the first communication and then reconnecting the second communication by using connection information of a corresponding network layer of the wireless communication apparatus acquired through the first communication when disconnection of the first communication is detected at the detecting.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a wireless communication apparatus, a wireless communication method, and a program according to the present invention will be explained below in detail with reference to the accompanying drawings.

Figure 1:
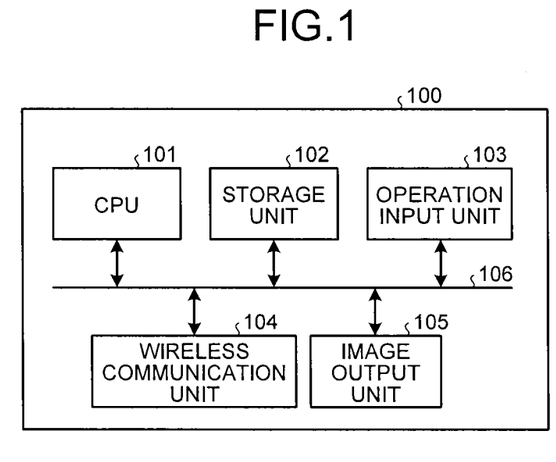
FIG. 1 is a block diagram of a hardware configuration example of a wireless communication apparatus according to an embodiment of the present invention.

FIG. 1 is a block diagram of a hardware configuration example of a wireless communication apparatus 100 according to an embodiment of the present invention. The wireless communication apparatus 100 performs wireless communication between an apparatus (an external apparatus) that relays data on a network. As shown in FIG. 1, the wireless communication apparatus 100 includes a CPU (Central Processing Unit) 101, a storage unit 102, an operation input unit 103, a wireless communication unit 104, and an image output unit 105, and these units are respectively connected via a bus 106.

The CPU 101 generally controls operations of the entire wireless communication apparatus 100 by executing a program stored in the storage unit 102. The storage unit 102 stores therein various types of data. More specifically, the storage unit 102 stores therein a program executed by the CPU 101 and first information that indicates information (a set value) related to wireless connection of layers that are lower than a network layer (a physical layer and a data link layer in the OSI reference model) and to network connection (wireless connection of layers higher that are at or higher than a network layer in the OSI reference model).

The operation input unit 103 is a device by which a user performs various input operations, and can be constituted by operation buttons and a keyboard, for example. The wireless communication unit 104 performs connection and reconnection of wireless communication and transmission/reception of communication data between the wireless communication apparatus 100 to an external apparatus under control of the CPU 101. The image output unit 105 is a device that can display various types of information under control of the CPU 101, and can be constituted by a liquid-crystal display apparatus, for example.

Figure 2:
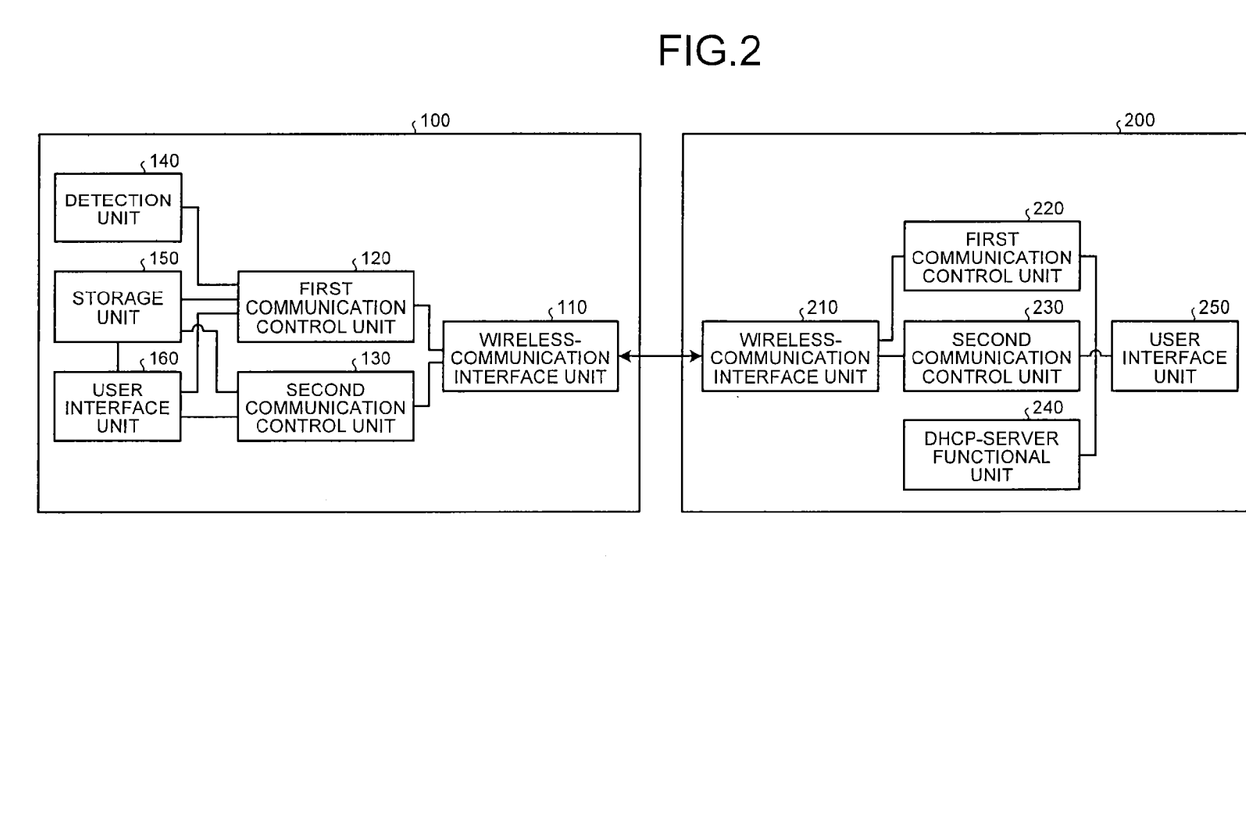
FIG. 2 is a block diagram of a functional configuration example of the wireless communication apparatus according to the embodiment.

FIG. 2 is a block diagram of a functional configuration example of the wireless communication apparatus 100 and an access point 200. As shown in FIG. 2, the wireless communication apparatus 100 is constituted by a wireless-communication interface unit 110, a first communication control unit 120, a second communication control unit 130, a detection unit 140, a storage unit 150, and a user interface unit 160.

The wireless-communication interface unit 110 is a functional unit that performs transfer of data via wireless communication according to instructions from the first communication control unit 120 and the second communication control unit 130. In the embodiment of the present disclosure, the wireless-communication interface unit 110 uses wireless LAN standards of the IEEE 802.11 series; however, wireless LAN standards other than the IEEE 802.11 can be also used.

The first communication control unit 120 is a functional unit that manages the first communication that is communication of the wireless communication apparatus 100 to an access point via wireless communication. The first communication control unit 120 also executes control from receiving a connection request of the first communication to establishing the requested connection. Furthermore, the first communication control unit 120 acquires address information from a DHCP (Dynamic Host Configuration Protocol) server via the first communication. When the first communication is disconnected, the first communication control unit 120 performs a reconnection process by using connection setting of the first communication stored in the storage unit 150. Further, the first communication control unit 120 performs roaming and switches access points. As an example of the roaming, there is a method of detecting a wireless wave condition and switching access points when the wireless wave condition is degraded more than a threshold set in advance.

The second communication control unit 130 is a functional unit that manages the second communication, which is communication of the wireless communication apparatus 100 to another communication apparatus via a network that includes access points. The second communication control unit 130 performs transmission and reception of data between the wireless communication apparatus 100 and another communication apparatus by using the address information acquired by the first communication control unit 120. Furthermore, when the first communication is disconnected, the second communication control unit 130 temporarily stops a process during the communication, and then resumes the second communication by using address information acquired by the first communication.

The detection unit 140 detects the communication status of the first communication being performed between the wireless communication apparatus 100 and the access point 200. Specifically, the detection unit 140 detects whether the first communication is disconnected, and when disconnection of the communication is detected, the disconnection is notified to the first communication control unit 120. Examples of the disconnection of the first communication includes a case where disconnection is caused by interruption of wireless communication by a device such as a microwave and a case where, as setting of an access point is changed, disconnection is caused by the access point stopping transmission of a beacon so as to reflect the change. Furthermore, the detection unit 140 detects switching of an access point by roaming. When the access point is switched by roaming, similarly to the disconnection of the first communication, the detection unit 140 notifies the change of the access point to the first communication control unit 120.

The storage unit 150 stores therein the first information mentioned above. For example, the first information includes information such as whether reconnection can be made, whether reconnection can be made between the first communication to an access point that is not transmitting any beacon indicating a wireless signal for notifying the presence of the access point itself, usable wireless standards at the time of reconnection, connectable channels at the time of reconnection, the connectable channel width at the time of roaming, whether an external apparatus to be connected by roaming can be changed, connectable wireless standards at the time of roaming, connectable channels at the time of roaming, the connectable channel width at the time of roaming, and information (a set value) related to a protocol to be used. Information related to the protocol to be used includes information such as whether a DHCP is used and information indicating that an IPv4 (Internet Protocol version 4) protocol or an IPv6 (Internet Protocol version 6) protocol is used. The storage unit 150 can be realized by the storage unit 102 shown in FIG. 1.

The user interface unit 160 has a function of receiving input from a user and a function of notifying a communication status to a user. The function of receiving input from a user receives input made by the user from the operation input unit 103. Specifically, by operating the operation input unit 103 that is constituted by operation buttons, an SSID related to wireless connection and an IP address related to network connection can be input. The input information is stored in the storage unit 150 as setting information of the first communication or the second communication. The function of notifying a communication status to a user performs control of notifying data and a connection result received from an access point by the first communication as well as a connection result of the second communication and a current communication status. In the present embodiment, information is notified (informed) to a user as the user interface unit 160 performs control of displaying these pieces of information on the image output unit 105; however, the present embodiment is not limited thereto and, for example, it is also possible to use a mode of notifying information to a user with audio output.

Furthermore, the function of notifying a user of a communication status to performs control of notifying the second information that indicates setting of the first information after reconnection, and performs control of notifying third information that indicates setting information of the second information after being changed when address information acquired by a DHCP is different from address information of the storage unit 150. The second information and the third information include information to be notified to a network manager.

For example, the second information includes pieces of information that indicate wireless standards with respect to an external apparatus, the connection status with respect to the external apparatus, the strength of a wireless wave transmitted and received with the external apparatus, the communication channel to the external apparatus, the communication channel of the external apparatus, the communication channel width of the external apparatus, a BSSID (Basic Service Set Identifier) of a signal of the external apparatus, and the communication rate with respect to the external apparatus.

Furthermore, for example, the third information includes information that indicates whether acquisition of address information by a DHCP has been successful, and when the communication protocol is the IPv4, the third information includes at least one of an IPv4 address, an IPv4 subnet mask address, and an IPv4 default gateway address acquired by the DHCP. When the communication protocol is the IPv6, the third information includes at least one of an IPv6 address, an IPv6 subnet mask address, and an IPv6 default gateway address acquired by the DHCP. While a case where the communication protocol is the IPv4 is exemplified in the following explanations, the same explanations can be applied to a case where the communication protocol is the IPv6.

As shown in FIG. 2, the access point 200 is constituted by a wireless-communication interface unit 210, a first communication control unit 220, a second communication control unit 230, a DHCP-server functional unit 240, and a network interface unit 250.

The wireless-communication interface unit 210 performs transfer of data via wireless communication according to instructions from the first communication control unit 220 and the second communication control unit 230. The first communication control unit 220 manages first communication between the access point 200 and the wireless communication apparatus 100. Specifically, the wireless-communication interface unit 210 also performs a connection process according to a connection request of the first communication from the wireless communication apparatus 100. Furthermore, the first communication control unit 220 receives an acquisition request of address information from the wireless communication apparatus 100. After receiving the acquisition request, the first communication control unit 220 acquires address information from the DHCP-server functional unit 240 and transmits the address information to the wireless communication apparatus 100. The second communication control unit 230 relays data transmitted and received between the wireless communication apparatus 100 and another communication apparatus via a network. That is, the second communication control unit 230 has functions of a communication relay apparatus such as a router, switching hub, and a hub, and performs processing related to data relay such as bridging and routing. The second communication control unit 230 can be an apparatus different from an access point.

The DHCP-server functional unit 240 provides, as a DHCP server, address information to the wireless communication apparatus 100. Specifically, upon request by the wireless communication apparatus 100, the DHCP-server functional unit 240 provides at least one of an IP address, a subnet mask address, and a default gateway address to the wireless communication apparatus 100. The DHCP-server functional unit 240 can accept the IPv4 and the IPv6. The DHCP-server functional unit 240 can be provided as an apparatus that is different from an access point. In this case, a DHCP server provided as a different apparatus performs transmission and reception of address information with the wireless communication apparatus 100 via an access point. Furthermore, the DHCP-server functional unit 240 can also perform transmission and reception of address information with the wireless communication apparatus 100 by using a communication protocol other than a DHCP. A BOOTP (Bootstrap Protocol) is an example of a communication protocol other than a DHCP.

The network interface unit 250 performs connection with a network, and performs transmission of data to another communication apparatus via the network.

In the present embodiment, respective functions of the wireless-communication interface unit 110, the first communication control unit 120, the second communication control unit 130, the detection unit 140, and the user interface unit 160 described above are realized by executing a program stored in the storage unit 102 by the CPU 101; however, the present embodiment is not limited thereto and, for example, it suffices that at least a part of the respective functions of the wireless-communication interface unit 110, the first communication control unit 120, the second communication control unit 130, the detection unit 140, and the user interface unit 160 described above is realized by a dedicated hardware circuit.

Figure 3:
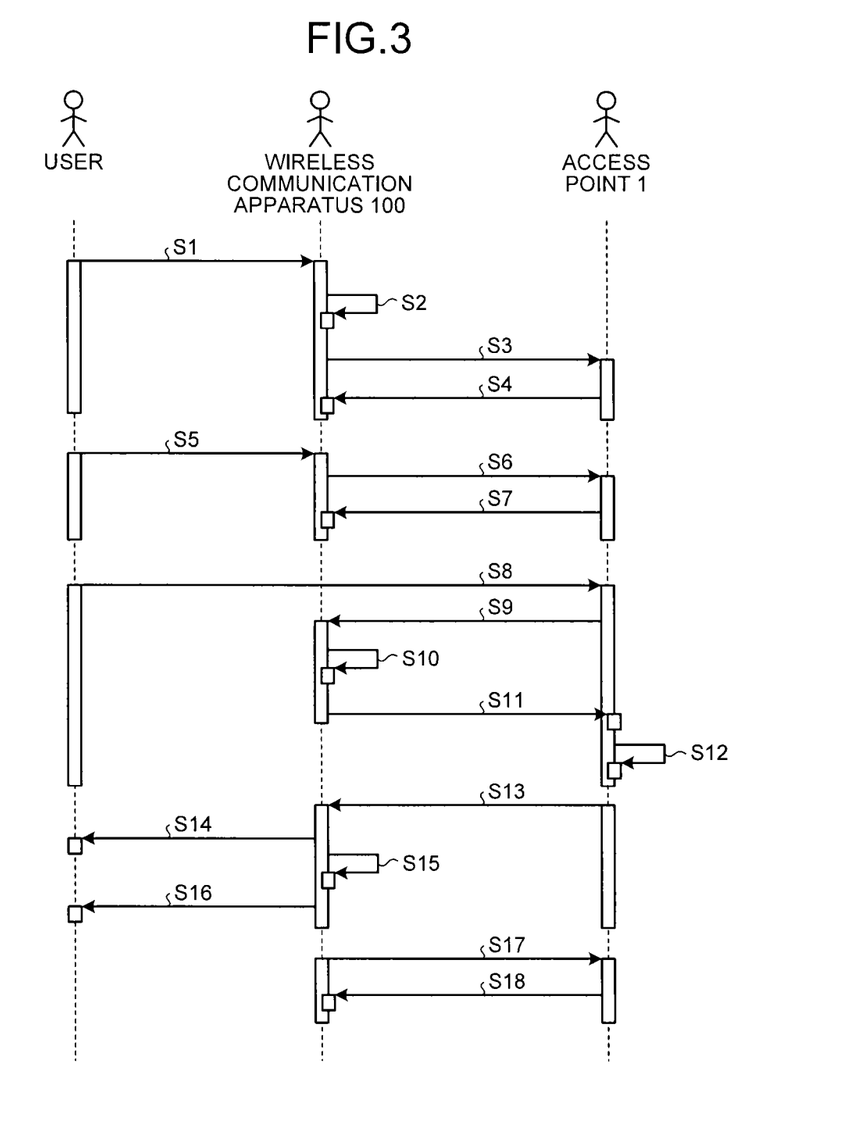
FIG. 3 is a sequence diagram of an example of a flow in which an access point after setting change and the wireless communication apparatus are reconnected.

An operation example of the wireless communication apparatus 100 is explained next. FIG. 3 is a sequence diagram of an example of a flow in which address information of the access point 1 being connected to the wireless communication apparatus 100 is changed, and the access point 1 after being changed and the wireless communication apparatus 100 are reconnected. The operation example of the wireless communication apparatus 100 is explained below with reference to FIG. 3.

As shown in FIG. 3, first, a user turns on the power of the wireless communication apparatus 100 (Step S1).

The wireless communication apparatus 100 reads, after its activation, the first information described above that is stored in the storage unit 150 (Step S2). The first information includes information such as set values related to the SSID to be connected, identification method, and encryption method. Next, the wireless communication apparatus 100 connects the first communication to the access point 1 according to the first information read at Step S1 (Step S3). The connection of the first communication between the wireless communication apparatus 100 and the access point 1 is then completed (Step S4).

Next, to perform a communication process, the user instructs start of the communication process to the wireless communication apparatus 100 (Step S5). Thereafter, the wireless communication apparatus 100 performs the second communication via the access point 1 (Step S6, Step S7).

Next, a set value (address information) is changed at the access point 1 (Step S8). Specifically, this change is, for example, a case where address information is changed due to addition of a device such as a mail server. To change the set value, the access point 1 notifies end of the first communication to the wireless communication apparatus 100 and stops transmission of a beacon (Step S9). The wireless communication apparatus 100 temporarily stops a process during the communication (Step S10), and attempts reconnection to the access point 1 for a certain period of time according to the first information read at Step S2 (Step S11).

The set value of the access point 1 is changed to a value set at Step S8 (Step S12). After changing the set value, in response to a request of reconnection by the wireless communication apparatus 100 at Step S11, the reconnection of the first communication between the wireless communication apparatus 100 and the access point 1 is completed (Step S13). Thereafter, the wireless communication apparatus 100 notifies the user of the result of reconnection and the second information described above (Step S14). Next, the wireless communication apparatus 100 controls address information after the reconnection to be variable according to the first information stored in the storage unit 150 (Step S15). When the address information after the reconnection is changed, the wireless communication apparatus 100 notifies the user of the third information described above (Step S16). Thereafter, the wireless communication apparatus 100 performs the second communication via the access point 1 (Step S17, Step S18).

Figure 4:
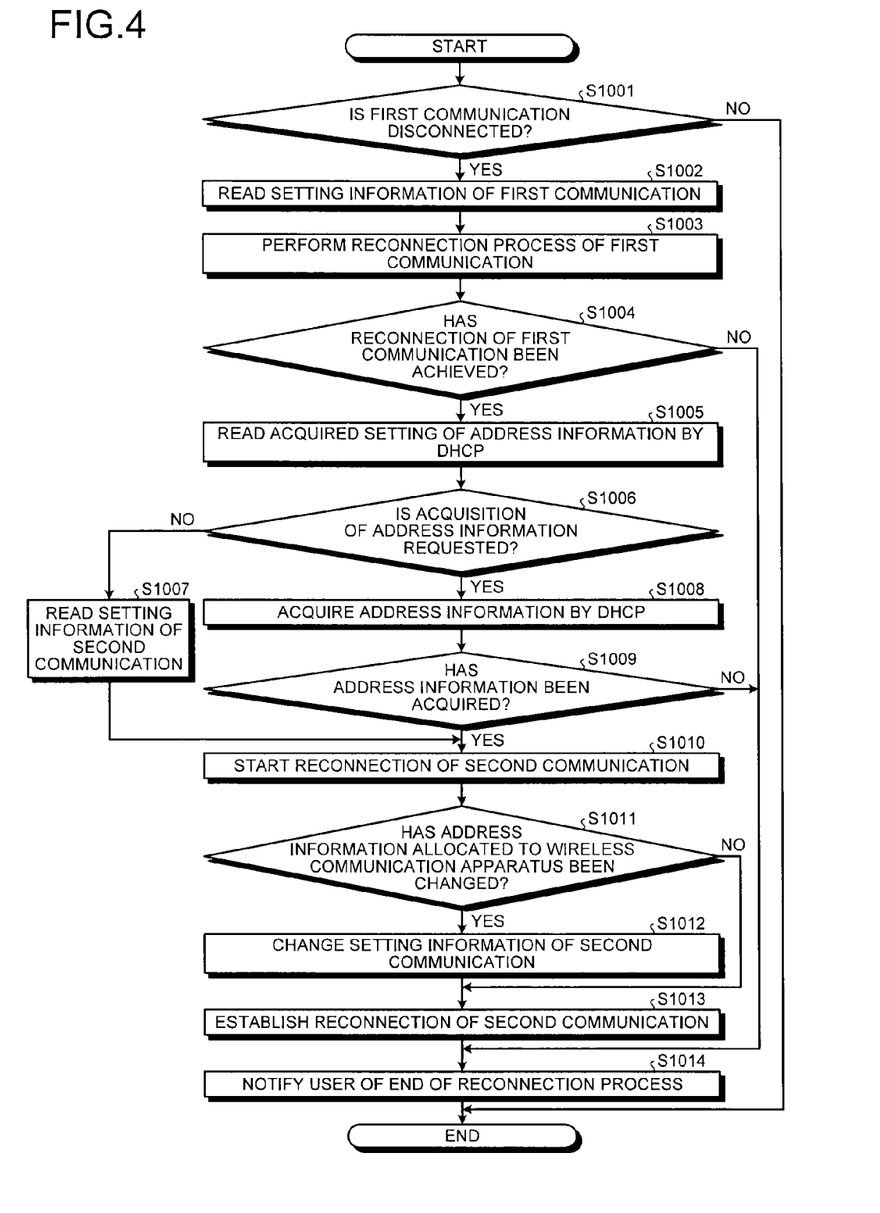
FIG. 4 is a flowchart of an example of a process performed by the wireless communication apparatus according to the embodiment when communication is reconnected.

An example of a process performed by the wireless communication apparatus 100 at the time of reconnection of the first communication and the second communication in the present embodiment is explained next. FIG. 4 is a flowchart of an example of a process procedure performed by the wireless communication apparatus 100 at the time of reconnection.

FIG. 4 depicts a process from disconnection of the first communication to notification of a result of reconnection to a user. The wireless communication apparatus 100 performs transmission and reception of data with another communication apparatus via a network, which has the first communication and the second communication established therein and includes an access point. The detection unit 140 determines whether the first communication is disconnected (Step S1001). When the first communication is not disconnected (NO at Step S1001), the wireless communication apparatus 100 continues a communication process. On the other hand, when the detection unit 140 determines that the first communication is disconnected (YES at Step S1001), the detection unit 140 notifies the disconnection of the first communication to the first communication control unit 120. The first communication control unit 120 reads the first information from the storage unit 150, and attempts reconnection of the first communication (Step S1002, Step S1003).

After performing the process of reconnection of the first communication at Step S1003, it is determined whether the reconnection of the first communication has been achieved (Step S1004). When the reconnection of the first communication has not been achieved (NO at Step S1004), the user interface unit 160 notifies the user of the fact that the reconnection of the first communication has not been achieved. At this time, the information notified to the user includes, as well as the information that indicates whether connection of the first communication has been achieved, at least a piece of information among the first information used in the process of the reconnection. The information notified to the user can be changed according to wireless communication standards used for the connection.

When the reconnection of the first communication is established (YES at Step S1004), the wireless communication apparatus 100 reads setting information from the storage unit 150, where the setting information indicating whether address information is acquired by using a DHCP (Step S1005). Thereafter, it is determined whether acquisition of the address information by using a DHCP is performed (Step S1006).

When the acquisition of the address information by using a DHCP is not performed (NO at Step S1006), the first communication control unit 120 reads address information from the storage unit 150, and resumes the second communication (Step S1007, Step S1010). Thereafter, at Step S1014, notification indicating whether resuming of the address information by using a DHCP is made, and a communication reconnection process is ended. A case where a specific IP address is allocated to the wireless communication apparatus 100 is an example of not performing the acquisition of the address information by using a DHCP. In this case, the acquisition of the address information by using a DHCP is not performed and the second communication is resumed by using the specific IP address.

When the acquisition of the address information by using a DHCP is performed (YES at Step S1006), the first communication control unit 120 transmits a request of the address information to a DHCP server, and acquires the address information (Step S1008). Thereafter, a confirmation whether the address information has been acquired by a DHCP is made (Step S1009). When the acquisition of the address information by using a DHCP has not been achieved (NO at Step S1009), the user interface unit 160 notifies the user of the fact that the acquisition of the address information by using a DHCP (Step S1014) has not been achieved. At this time, there is a case where an access point does not use a DHCP, and the method of acquiring the address information is switched to a method of allocating a specific IP address to the wireless communication apparatus 100, and therefore it is recommendable to notify the user that setting related to the acquisition of the address information by using a DHCP is switched.

When the address information has been acquired by using a DHCP (YES at Step S1009), reconnection of the second communication is started by using the acquired address information (Step S1010). After acquiring the address information, it is confirmed whether the address information allocated to the wireless communication apparatus 100 has been changed (Step S1011). When the address information of the wireless communication apparatus 100 is not changed (NO at Step S1011), a resuming operation of the second communication is ended, a result of resuming the second communication is notified to the user, and a reconnection process is ended (Step S1014). On the other hand, when the address information of the wireless communication apparatus 100 is changed (YES at Step S1011), the address information stored in the storage unit 150 is changed to the address information acquired by a DHCP (Step S1012). Thereafter, the reconnection process of the second communication is ended and a result of the reconnection is notified to the user (Step S1013, Step S1014).

Figure 5:
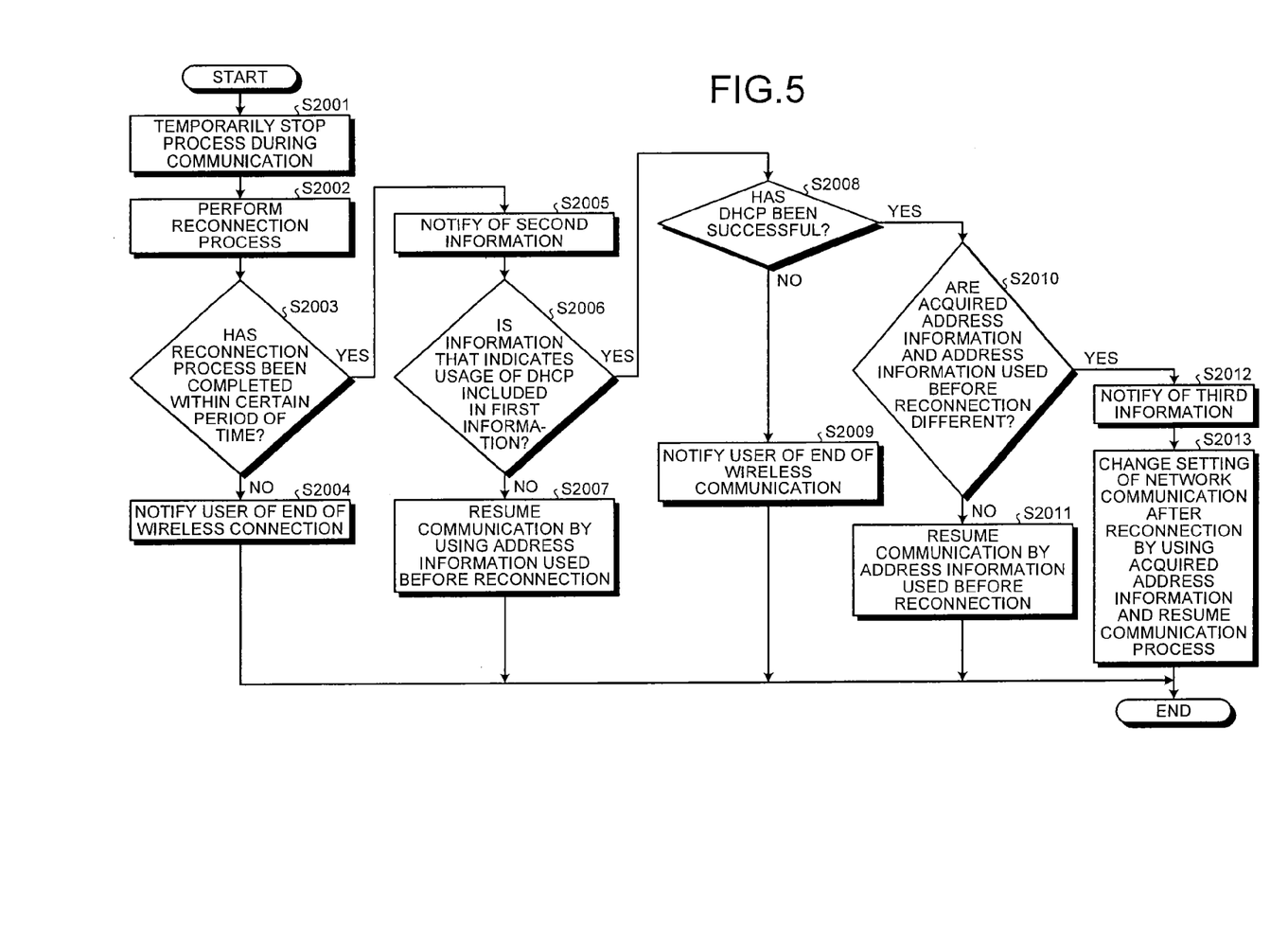
FIG. 5 is a flowchart of an example of a notification process to a user performed by the wireless communication apparatus according to the embodiment when communication is reconnected.

FIG. 5 is a flowchart of an example of a notification process to a user (a network manager) when reconnection of the first communication and the second communication is performed. As shown in FIG. 5, when the first communication between the wireless communication apparatus 100 and the access point 1 having been connected thereto is ended, the wireless communication apparatus 100 temporarily stops a process during the communication (Step S2001). Next, the wireless communication apparatus 100 attempts a reconnection process to an access point for a certain period of time according to the first information stored in the storage unit 150 (Step S2002).

Next, the wireless communication apparatus 100 determines whether the reconnection process has been completed within a certain period of time (Step S2003). When the reconnection process has not been completed with a certain period of time (NO at Step S2003), the wireless communication apparatus 100 notifies the user of end of wireless communication and ends the process (Step S2004). When the reconnection process has been completed within a certain period of time (YES at Step S2003), the wireless communication apparatus 100 notifies the user of at least a piece of information of the second information that indicates setting of the first communication after the reconnection (Step S2005).

Next, the wireless communication apparatus 100 refers to the first information stored therein and determines whether to acquire address information from a DHCP server of an access point by the apparatus itself (Step S2006). When it is determined that address information is not acquired from the DHCP server of the access point by the apparatus itself (NO at Step S2006), the wireless communication apparatus 100 resumes a communication process by using address information of the apparatus itself used before reconnection (Step S2007). In this example, the address information includes an IP address of the IPv4, a subnet mask address of the IPv4, and a default gateway address of the IPv4.

On the other hand, at Step S2006, when it is determined that address information is acquired from the DHCP server of the access point by the apparatus itself (YES at Step S2006), the wireless communication apparatus 100 acquires address information by a DHCP. When the acquisition of the address information by the DHCP has failed (NO at Step S2008), the wireless communication apparatus 100 notifies the user of end of wireless communication due to the failure of the acquisition by the DHCP and ends the process (Step S2009). Meanwhile, when the acquisition of the address information by the DHCP has been successful (YES at Step S2008), the wireless communication apparatus 100 determines whether the address information acquired by the DHCP and the address information used before reconnection are different (Step S2010).

At Step S2010, when the address information acquired by the DHCP and the address information used before reconnection match each other (NO at Step S2010), the wireless communication apparatus 100 resumes the communication process by using the address information used before reconnection (Step S2011). Meanwhile, at Step S2010, when the address information acquired by the DHCP and the address information used before reconnection are different (YES at Step S2010), the wireless communication apparatus 100 notifies the user of at least a piece of information of the third information that includes the address information acquired by the DHCP (Step S2012). Next, the wireless communication apparatus 100 changes setting of network communication after reconnection by using the address information acquired by the DHCP and resumes the communication process (Step S2013). More specifically, the wireless communication apparatus 100 changes respective values of the IP address, subnet mask address, and default gateway address to the IP address of the IPv4, subnet mask address of the IPv4, and default gateway address of the IPv4, and resumes the communication process.

As explained above, when the first communication to the access point is disconnected, the wireless communication apparatus 100 according to the present embodiment can reconnect to the access point according to the first information related to connection of the first communication stored in the storage unit 150, and can automatically perform processes related to acquisition and change of the address information after reconnection. With this configuration, even if address information used in the second communication is changed, even users who do not have any particular expertise in network communication can resume the second communication.

Figure 6:
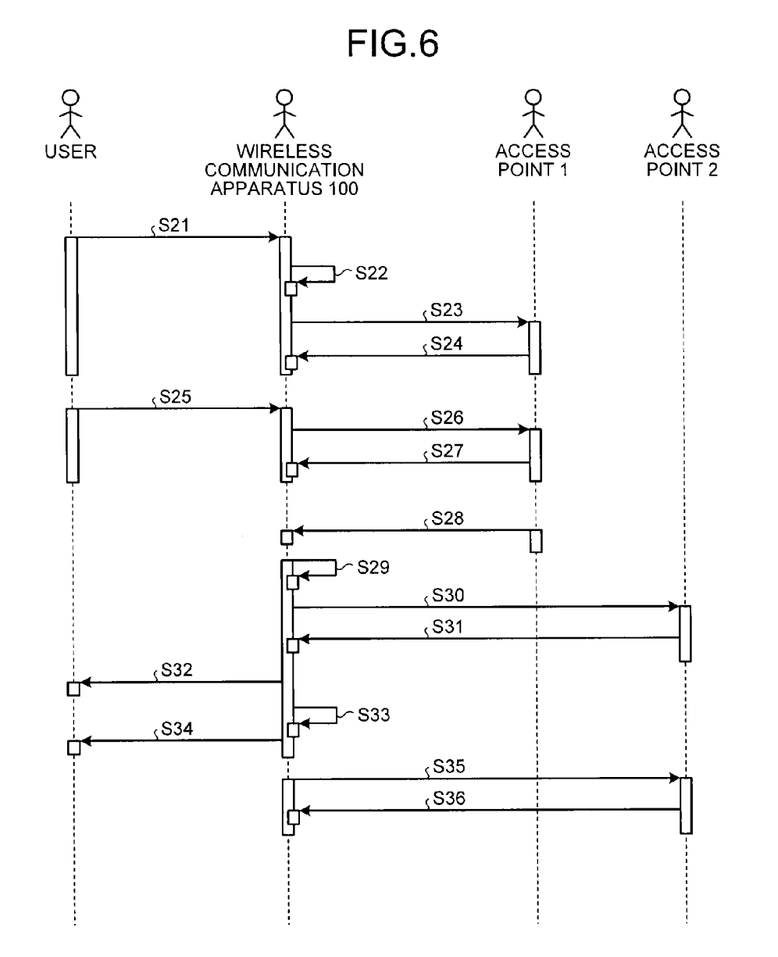
FIG. 6 is a sequence diagram of an example of a flow in which the wireless communication apparatus and an access point connected thereto is disconnected and the wireless communication apparatus is reconnected to another access point.

FIG. 6 is a sequence diagram of an example of a flow in which the wireless communication apparatus 100 and the access point 1 connected thereto is disconnected and the wireless communication apparatus 100 is reconnected to another access point 2. The access point 2 has set therein the same SSID, identification method, and encryption method as those of the access point 1. The access point 2 has set therein a communication channel and address information different from those of the access point 1. The wireless communication apparatus 100 includes the first information that is necessary for connecting a plurality of access points. An operation example of the wireless communication apparatus 100 is explained below with reference to FIG. 6.

A user turn on the power of the wireless communication apparatus 100 (Step S21). The wireless communication apparatus 100 reads, after its activation, the first information described above that is stored in the storage unit 150 (Step S22). Next, the wireless communication apparatus 100 connects the first communication to the access point 1 according to the first information read at Step S22 (Step S23). The connection of the first communication between the wireless communication apparatus 100 and the access point 1 is then completed (Step S24).

Next, to perform a communication process, the user instructs start of a communication process to the wireless communication apparatus 100 (Step S25). Thereafter, the wireless communication apparatus 100 performs the second communication via the access point 1 (Step S26, Step S27).

Thereafter, due to a wireless interference failure or an access point failure, the access point 1 notifies end of communication to the wireless communication apparatus 100, and stops transmission of a beacon (Step S28). The wireless communication apparatus 100 temporarily stops a process during the communication (Step S29), and attempts reconnection to the access point 1 for a certain period of time according to the first information read at Step S22 (Step S30).

Subsequently, reconnection of the first communication between the wireless communication apparatus 100 and another access point 2 is completed as the access point 2 responding to a request of reconnection by the wireless communication apparatus 100 at Step S30 (Step S31). The wireless communication apparatus 100 then notifies the user of a result of the reconnection and the second information described above (Step S32). Next, the wireless communication apparatus 100 reads setting information that indicates whether acquisition of address information by a DHCP stored in the storage unit 150 is performed. According to the setting information, the wireless communication apparatus 100 performs processes of acquisition and change of the address information (Step S33). When the address information after reconnection is changed, the wireless communication apparatus 100 notifies the user of the third information described above (Step S34). Thereafter, the wireless communication apparatus 100 performs the second communication via the access point 2 (Step S35, Step S36).

As explained above, when the first communication to the access point is disconnected, the wireless communication apparatus 100 according to the present embodiment can reconnect to another access point according to the first information related to connection of the first communication stored in the storage unit 150, and can automatically perform processes related to acquisition and change of the address information after reconnection. With this configuration, even if address information provided from the access point is changed, even users who do not have any particular expertise in network communication can resume the second communication.

Figure 7:
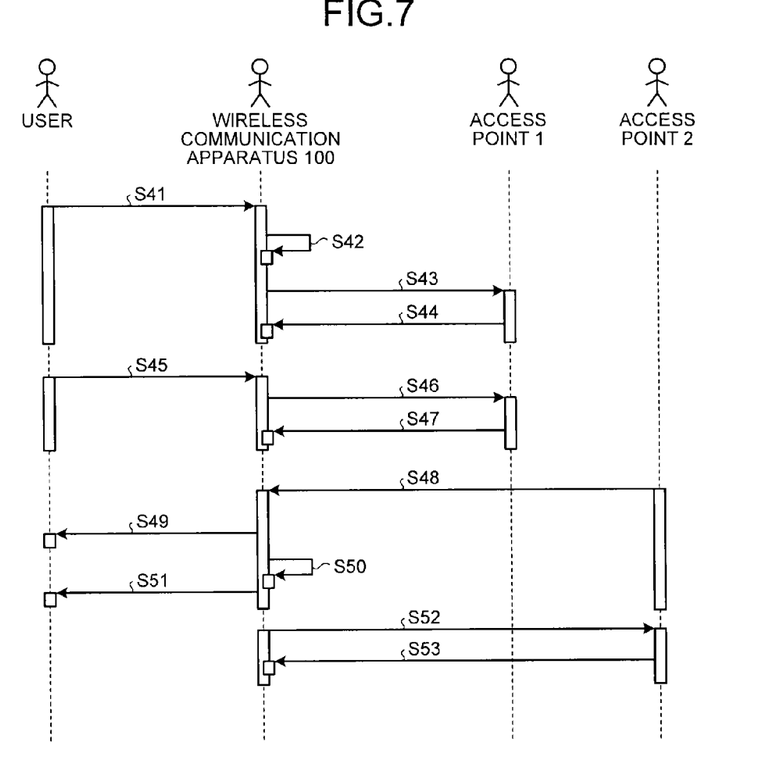
FIG. 7 is a sequence diagram of an example of a flow in which connection of the wireless communication apparatus to an access point is shifted to another access point by roaming.

FIG. 7 is a sequence diagram of an example of a flow in which connection of the wireless communication apparatus to the access point 1 is shifted to another access point 2 by roaming. The access point 2 has set therein the same SSID, identification method, and encryption method as those of the access point 1. The access point 2 has set therein a communication channel and address information different from those of the access point 1. The wireless communication apparatus 100 includes the first information that is necessary for connecting a plurality of access points. An operation example of the wireless communication apparatus 100 is explained below with reference to FIG. 7.

A user turn on the power of the wireless communication apparatus 100 (Step S41). The wireless communication apparatus 100 reads, after its activation, the first information described above that is stored in the storage unit 150 (Step S42). Next, the wireless communication apparatus 100 connects the first communication to the access point 1 according to the first information read at Step S42 (Step S43). The connection of the first communication between the wireless communication apparatus 100 and the access point 1 is then completed (Step S44).

Next, to perform a communication process, the user instructs start of a communication process to the wireless communication apparatus 100 (Step S45). Thereafter, the wireless communication apparatus 100 performs the second communication via the access point 1 (Step S46, Step S47).

Next, when the connecting destination of the wireless communication apparatus 100 is switched from the access point 1 to the access point 2 by roaming, the access point 2 notifies the wireless communication apparatus 100 of the fact that the wireless communication apparatus 100 has connected to the access point 2 by roaming (Step S48). The wireless communication apparatus 100 then notifies an operator of the result of reconnection and the second information described above (Step S49). Thereafter, the wireless communication apparatus 100 controls setting of the address information after the reconnection to be variable according to the first information stored in the storage unit 150 (Step S50). When the setting of the address information after the reconnection is changed, the wireless communication apparatus 100 notifies the operator of the third information described above (Step S51). Subsequently, the wireless communication apparatus 100 performs the second communication via the access point 2 (Step S52, Step S53).

As explained above, the wireless communication apparatus 100 according to the present embodiment performs roaming according to the first information related to connection of the first communication that is stored in the storage unit 150, and can automatically perform processes related to acquisition and change of address information after the roaming. With this configuration, even if address information provided from an access point is changed, even users who do not have any particular expertise in network communication can resume the second communication.

Various programs executed by the wireless communication apparatus 100 described above can be provided as these programs are recorded in a computer-readable storage medium such as a CD-ROM, a flexible disk (FD), a CD-R, a digital versatile disk (DVD), a universal serial bus (USB), as a file of an installable format or an executable format, and these programs can be provided or distributed via a network such as the Internet. In addition, these various programs can be distributed as the programs are incorporated in a ROM or the like in advance.

According to the embodiment, even if connection information of a network layer provided by an access point is changed, after reconnection of communication between the access point to the wireless communication apparatus via wireless communication, acquisition and changing of the connection information of the network layer can be automatically performed. With this configuration, even if the connection information of the network layer is changed, even users who do not have any particular expertise in network communication can resume communication between the wireless communication apparatus and another communication apparatus via a network.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A wireless communication apparatus for communicating with an access point through a first communication and communicating with another communication apparatus through a second communication via a network including an access point, the wireless communication apparatus comprising:
   a user interface; and processing circuitry configured to
    detect a status of the first communication;
    reconnect the first communication and then reconnect the second communication by using connection information of a corresponding network layer of the wireless communication apparatus acquired through the first communication when disconnection of the first communication is detected;
    determine whether the connection information of the network layer of the wireless communication apparatus has been changed, by acquiring the connection information of the network layer of the wireless communication apparatus through the first communication; and
    notify a user, via the user interface, of the connection information of the network layer acquired through the first communication when the processing circuitry determines that connection information of a network layer allocated to the wireless communication apparatus has been changed, wherein
when the processing circuitry determines that the connection information of the network layer has been changed, the connection information of the network layer of the wireless communication apparatus stored in the wireless communication apparatus is changed to the connection information of the network layer of the wireless communication apparatus acquired through the first communication,
the processing circuitry is configured to notify the user, via the user interface, that the connection information of the network layer of the wireless communication apparatus cannot be acquired by a DHCP (Dynamic Host Configuration Protocol) when the connection information of the network layer through the first communication has not been acquired, and
when the processing circuitry determines that the access point has been changed to use a method of allocating a specific IP address to the wireless communication apparatus without DHCP, the processing circuitry notifies the user, via the user interface, that a setting related to acquisition of address information to be used for DHCP is switched.

2. The wireless communication apparatus according to claim 1, wherein
the access point includes a DHCP server, and
the access point is configured to acquire connection information of a network layer from the DHCP server.

3. The wireless communication apparatus according to claim 1, the processing circuitry being further configured to
    detect a wireless wave condition of the first communication and switch an access point to another access point according to the detected wireless wave condition, wherein
    acquire connection information of a corresponding network layer of the wireless communication apparatus from the another access point, and reconnect the second communication when the access point is switched to the another access point.

4. The wireless communication apparatus according to claim 1, wherein the connection information of the network layer includes information that includes at least one of an IP address, a subnet mask address, and a default gateway address, and information that indicates an Internet protocol version to be used.

5. The wireless communication apparatus according to claim 1, wherein the connection of the first communication includes at least a piece of information among an SSID of the access point, an identification method, and an encryption method, a set value related to the encryption method, wireless communication connection standards, a frequency channel, a frequency channel width, information that indicates whether reconnection to the first communication is to be made, information that indicates whether reconnection is to be made to an access point that is not transmitting a beacon, information that indicates whether roaming is to be performed, connectable wireless communication standards when roaming is performed, a connectable frequency channel when roaming is performed, and a connectable frequency channel width when roaming is performed.

6. The wireless communication apparatus according to claim 1, wherein the processing circuitry is configured to output a notification of at least a piece of information among a connection status to the access point, wireless communication connection standards, information of wireless wave strength, a frequency channel, a frequency channel width, an SSID, and a communication rate.

7. The wireless communication apparatus according to claim 1, wherein when a process of reconnection of the first communication has not been achieved, the processing circuitry is configured to notify the user, via the user interface, that reconnection of the first communication has not been achieved and at least a piece of information used in the reconnection process that is changeable.

8. A wireless communication method performed by using a wireless communication apparatus for communicating with an access point through a first communication and communicating with another communication apparatus through a second communication via a network including an access point, the wireless communication method comprising:
    detecting a status of the first communication;
    reconnecting the first communication and then reconnecting the second communication by using connection information of a corresponding network layer of the wireless communication apparatus acquired through the first communication when disconnection of the first communication is detected at the detecting;
    determining whether the connection information of the network layer of the wireless communication apparatus has been changed, by acquiring the connection information of the network layer of the wireless communication apparatus through the first communication; and
    notifying a user, via a user interface of the wireless communication apparatus, of the connection information of the network layer acquired through the first communication when it is determined that connection information of a network layer allocated to the wireless communication apparatus has been changed, wherein
when it is determined that the connection information of the network layer has been changed, the connection information of the network layer of the wireless communication apparatus stored in the wireless communication apparatus is changed to the connection information of the network layer of the wireless communication apparatus acquired through the first communication,
the method further includes notifying the user, via the user interface, that the connection information of the network layer of the wireless communication apparatus cannot be acquired by a DHCP (Dynamic Host Configuration Protocol) when the connection information of the network layer through the first communication has not been acquired, and when it is determined that the access point has been changed to use a method of allocating a specific IP address to the wireless communication apparatus without DHCP, the user is notified, via the user interface, that a setting related to acquisition of address information to be used for DHCP is switched.

9. A non-transitory computer-readable storage medium with an executable program stored thereon and executed by a computer of a wireless communication apparatus for communicating with an access point through a first communication and communicating with another communication apparatus through a second communication via a network including an access point, wherein the program instructs the computer to perform:

detecting a status of the first communication;
 reconnecting the first communication and then reconnecting the second communication by using connection information of a corresponding network layer of the wireless communication apparatus acquired through the first communication when disconnection of the first communication is detected at the detecting;
 determining whether the connection information of the network layer of the wireless communication apparatus has been changed, by acquiring the connection information of the network layer of the wireless communication apparatus through the first communication; and
 notifying a user, via a user interface of the wireless communication apparatus, of the connection information of the network layer acquired through the first communication when it is determined that connection information of a network layer allocated to the wireless communication apparatus has been changed, wherein when it is determined that the connection information of the network layer has been changed, the connection information of the network layer of the wireless communication apparatus stored in the wireless communication apparatus is changed to the connection information of the network layer of the wireless communication apparatus acquired through the first communication, the method further includes notifying the user, via the user interface, that the connection information of the network layer of the wireless communication apparatus cannot be acquired by a DHCP (Dynamic Host Configuration Protocol) when the connection information of the network layer through the first communication has not been acquired, and when it is determined that the access point has been changed to use a method of allocating a specific IP address to the wireless communication apparatus without DHCP, the user is notified, via the user interface, that a setting related to acquisition of address information to be used for DHCP is switched.

* * * * *